(12) United States Patent
Hayakawa et al.

(10) Patent No.: US 9,564,813 B2
(45) Date of Patent: Feb. 7, 2017

(54) SWITCHING POWER-SUPPLY DEVICE

(71) Applicant: Sanken Electric Co., Ltd., Niiza-Shi, Saitama (JP)

(72) Inventors: Akira Hayakawa, Niiza (JP); Masaaki Shimada, Niiza (JP)

(73) Assignee: SANKEN ELECTRIC CO., LTD., Niiza-shi (JP)

( * ) Notice: Subject to any disclaimer, the term of this patent is extended or adjusted under 35 U.S.C. 154(b) by 195 days.

(21) Appl. No.: 14/576,386

(22) Filed: Dec. 19, 2014

(65) Prior Publication Data
US 2015/0280585 A1    Oct. 1, 2015

(30) Foreign Application Priority Data

Mar. 28, 2014    (JP) .................................. 2014-068318

(51) Int. Cl.
*H02M 3/335* (2006.01)
*H02M 1/00* (2006.01)

(52) U.S. Cl.
CPC ..... *H02M 3/33515* (2013.01); *H02M 3/33507* (2013.01); *H02M 2001/0032* (2013.01); *Y02B 70/16* (2013.01)

(58) Field of Classification Search
CPC ..................... H02M 3/33507; H02M 3/33523; H02M 3/156; H02M 3/33515; H02M 2001/0019; H02M 2001/0032; H02M 2001/0096; H02M 2003/1566; H02M 3/33553

See application file for complete search history.

(56) References Cited

U.S. PATENT DOCUMENTS

2006/0284567 A1* 12/2006 Huynh .............. H02M 3/33507
                                                              315/246
2010/0027299 A1*  2/2010 Fang ................. H02M 3/33507
                                                             363/21.15
2010/0164455 A1*  7/2010 Li ......................... H02M 3/157
                                                             323/283

FOREIGN PATENT DOCUMENTS

JP          2010-158167 A     7/2010

* cited by examiner

*Primary Examiner* — Adolf Berhane
*Assistant Examiner* — Henry Lee, III
(74) *Attorney, Agent, or Firm* — Mots Law, PLLC

(57) ABSTRACT

Disclosed is a switching power-supply device that induces a pulse voltage in a secondary winding of the transformer, and outputs, to a load, an output voltage rectified and smoothened by a secondary-side rectification smoothing circuit including a rectifier diode and a smoothing capacitor. An input-voltage detection circuit detects the input voltage of the alternating-current power supply. An error amplifier compares the output voltage with a reference voltage, and transmits a resultant error voltage to a primary side as a feedback signal. An internal oscillation circuit selects any of frequency decrease settings according to the input voltage detected by the input-voltage detection circuit, and performs, by using the selected frequency decrease setting, a frequency decreasing function of decreasing a switching frequency of the switching element at a light load, in response to the feedback signal transmitted from a secondary side to inform a state of the load.

9 Claims, 4 Drawing Sheets

SWITCHING POWER-SUPPLY DEVICE

CROSS REFERENCE TO RELATED APPLICATIONS

This application claims priority based on 35 USC 119 from prior Japanese Patent Application No. 2014-068318 filed on Mar. 28, 2014, entitled "SWITCHING POWER-SUPPLY DEVICE", the entire contents of which are hereby incorporated by reference.

TECHNICAL FIELD

The invention relates to a switching power-supply device that performs output voltage control by switching operation.

BACKGROUND ART

Japanese Patent Application Publication No. 2010-158167 (Patent Document 1) discloses a technique for a switching power-supply device to decrease a switching frequency at light/middle load. This reduces a loss in a switching element, thereby improving efficiency.

SUMMARY OF THE INVENTION

Voltages of commercial alternating-current power supplies vary among countries and are roughly classified into a 100-V system of 100 V to 120 V and a 200-V system of 200 V to 260 V. Switching power-supply devices are expected to support all of these input voltages. However, in the above-described technique, a frequency variable operation point for starting a decrease of the switching frequency and a decreasing rate of the switching frequency are controlled based on a single setting prepared beforehand. Therefore, even if the input voltages are different, a common setting is used for the frequency variable operation point and the decreasing rate of the switching frequency. Accordingly, there is a problem in that depending on the input voltage, the switching power-supply device cannot operate at an optimum switching frequency, and consequently cannot improve efficiency as desired.

An aspect of an embodiment provides a switching power-supply device that rectifies an input voltage of an alternating-current power supply to a direct-current voltage, applies the direct-current voltage to a primary winding of a transformer to cause switching operation of a switching element connected to the primary winding of the transformer, thereby inducing a pulse voltage in a secondary winding of the transformer, and outputs, to a load, an output voltage rectified and smoothened by a secondary-side rectification smoothing circuit including a rectifier diode and a smoothing capacitor. The switching power-supply device comprises an input-voltage detection circuit that detects the input voltage of the alternating-current power supply; an error amplifier that compares the output voltage with a reference voltage, and transmits a resultant error voltage to a primary side as a feedback signal; and an internal oscillation circuit that selects any of frequency decrease settings according to the input voltage detected by the input-voltage detection circuit, and performs, by using the selected frequency decrease setting, a frequency decreasing function of decreasing a switching frequency of the switching element at a light load, in response to the feedback signal transmitted from a secondary side to inform a state of the load.

Another aspect of an embodiment provides a switching power-supply device that rectifies an input voltage of an alternating-current power supply to a direct-current voltage, applies the direct-current voltage to a primary winding of a transformer to cause switching operation of a switching element connected to the primary winding of the transformer, thereby inducing a pulse voltage in a secondary winding of the transformer, and outputs, to a load, an output voltage rectified and smoothened by a secondary-side rectification smoothing circuit including a rectifier diode and a smoothing capacitor. The switching power-supply device comprising an input-voltage detection circuit that detects the input voltage of the alternating-current power supply, an error amplifier that samples and holds a voltage generated in a tertiary winding of the transformer after the switching element is turned off, obtains an error voltage by comparing the sampled and held voltage with a reference voltage, and outputs the error voltage as a feedback signal to a control circuit that controls the switching operation of the switching element, and an internal oscillation circuit that selects any of frequency decrease settings according to the input voltage detected by the input-voltage detection circuit, and performs, by using the selected frequency decrease setting, a frequency decreasing function of decreasing a switching frequency of the switching element at a light load, in response to the feedback signal transmitted from a secondary side to inform a state of the load.

Another aspect of an embodiment provides a switching power-supply device that comprises a transformer comprising a rectifier circuit that rectifies an input voltage of an alternating-current power supply, a primary winding to which a direct-current voltage rectified by the rectifier circuit is to be applied, a switching element connected to the primary winding, a secondary winding that induces a pulse voltage based on switching of the switching element, a rectifier diode, and a smoothing capacitor, wherein the transformer outputs an output voltage rectified and smoothened, an input-voltage detection circuit that detects the input voltage, an error amplifier that compares the output voltage with a reference voltage, and outputs a resultant error voltage as a feedback signal, and an internal oscillation circuit that decreases a switching frequency of the switching element at a light load, based on the input voltage detected by the input-voltage detection circuit, and the feedback signal.

EMBODIMENTS

Figure 1:
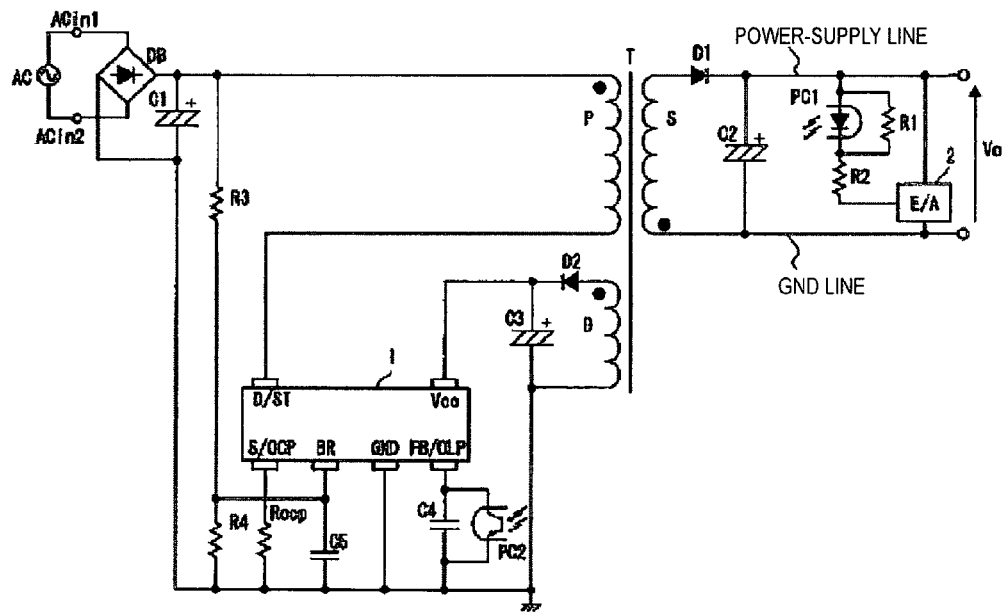
FIG. 1 is a diagram illustrating a circuit configuration according to an embodiment of a switching power-supply device.

Embodiments of the invention are explained with referring to drawings. In the respective drawings referenced herein, the same constituents are designated by the same reference numerals and duplicate explanation concerning the same constituents is basically omitted. All of the drawings are provided to illustrate the respective examples only. No dimensional proportions in the drawings shall impose a restriction on the embodiments. For this reason, specific dimensions and the like should be interpreted with the following descriptions taken into consideration. In addition, the drawings include parts whose dimensional relationship and ratios are different from one drawing to another.

FIG. 1 illustrates a switching power-supply device according to a first embodiment. This switching power-supply device includes rectifier circuit DB, smoothing capacitors C1, C2, and C3, transformer T, controller IC 1, rectifier diodes D1 and D2, error amplifier (E/A) 2, light emission diode PC1 and light reception transistor PC2 included in a photocoupler, current detection resistor Rocp, resistors R1, R2, R3, and R4, and capacitors C4 and C5.

Rectifier circuit DB has a diode bridge configuration, and commercial alternating-current power supply AC is connected to AC input terminals ACin1 and ACin2 of rectifier circuit DB. An alternating-current voltage inputted from commercial alternating-current power supply AC is full-wave rectified, and then is outputted from rectifier circuit DB. Smoothing capacitor C1 is connected between a rectification output positive terminal and a rectification output negative terminal of rectifier circuit DB. Further, the rectification output negative terminal of rectifier circuit DB is connected to an earth terminal. Thus, direct-current power is obtained by rectification and smoothing of commercial alternating-current power supply AC performed by rectifier circuit DB and smoothing capacitor C1.

Controller IC 1 includes a switching element such as a power MOSFET (Metal Oxide Semiconductor Field Effect Transistor) transistor, and a control circuit for performing switching control of the switching element. Controller IC 1 includes a D/ST (MOSFET drain and starting-current input) terminal, an S/OCP (MOSFET source and overcurrent protection) terminal, a Vcc (control-circuit supply voltage input) terminal, a FB/OLP (feedback-signal input and overload-protection-signal input) terminal, a BR (brown-in/out) terminal, and a GND terminal.

Transformer T supplies power from a primary side (an input side) to a secondary side (a load side), and includes primary winding P, auxiliary winding D, and secondary winding S. The rectification output positive terminal of rectifier circuit DB is connected to one end of primary winding P of transformer T, and the other end of primary winding P of transformer T is connected to the D/ST terminal of controller IC 1. Further, the S/OCP terminal of controller IC 1 is connected to the earth terminal via resistor Rocp. Thus, by controlling ON/OFF of the switching element included in controller IC 1, the power applied to primary winding P of transformer T is transmitted to secondary winding S of transformer T, so that a pulsating current is generated in secondary winding S of transformer T. Further, current detection resistor Rocp is connected as a resistor that detects an electric current flowing through the switching element included in controller IC 1, as voltage signal $V_{OCP}$. Controller IC 1 has an overcurrent protection (OCP) function. The OCP function is provided to limit power to be supplied to the secondary side, when voltage signal $V_{OCP}$ corresponding to an electric current flowing through the switching element becomes equal to or greater than an overcurrent threshold set beforehand.

Further, resistor R3 and resistor R4 are connected in series between the rectification output positive terminal of rectifier circuit DB and the earth terminal, to serve as a voltage-dividing resistor. A connection point between resistor R3 and resistor R4 is connected to the BR terminal of controller IC 1, and capacitor C5 for removal of high frequency noise is connected between the BR terminal and the earth terminal. Thus, a voltage proportional to a direct-current voltage outputted from rectifier circuit DB is inputted to the BR terminal. Controller IC 1 has a brown-in/brown-out function. The brown-in/brown-out function is provided to monitor a voltage (hereinafter referred to as "input voltage") of the commercial alternating-current power supply AC based on the voltage of the BR terminal, and to prevent an over-input current and overheat by stopping switching operation when the input voltage is low.

Smoothing capacitor C2 is connected between both terminals of secondary winding S of transformer T, via rectifier diode D1. A voltage induced in secondary winding S of transformer T is rectified and smoothed by rectifier diode D1 and smoothing capacitor C2. An inter-terminal voltage of smoothing capacitor C2 is outputted as output voltage $V_O$ from an output terminal. A line connected to a positive terminal of smoothing capacitor C2 is a power-supply line, and a line connected to a negative terminal of smoothing capacitor C2 is a GND line connected to the earth terminal.

Error amplifier 2 is connected in series between the power-supply line and the GND line. Error amplifier 2 controls an electric current flowing to light emission diode PC1 of the photocoupler, according to a difference between output voltage $V_O$ and a constant voltage. Further, the FB/OLP terminal of controller IC 1 is connected to the earth terminal via light emission diode PC1 and capacitor C4 connected in parallel. Thus, a feedback (FB) signal corresponding to output voltage $V_O$ is transmitted from light emission diode PC1 on the secondary side to light reception transistor PC2 on the primary side, as a signal of informing a state of a load. The transmitted signal is then inputted to the FB/OLP terminal of controller IC 1 as voltage signal $V_{FB}$. Controller IC 1 controls a duty ratio of the switching element based on voltage signal $V_{FB}$ inputted to the FB/OLP terminal, thereby controlling an amount of power to be supplied to the secondary side.

Further, smoothing capacitor C3 is connected between load terminals of auxiliary winding D of transformer T via rectifier diode D2. A connection point between rectifier diode D2 and smoothing capacitor C3 is connected to the Vcc terminal of controller IC 1. Thus, a voltage generated in auxiliary winding D is rectified and smoothed by rectifier diode D2 and smoothing capacitor C3, and then is supplied to the Vcc terminal of controller IC 1 as power-supply voltage $V_{CC}$ for IC.

Figure 2:
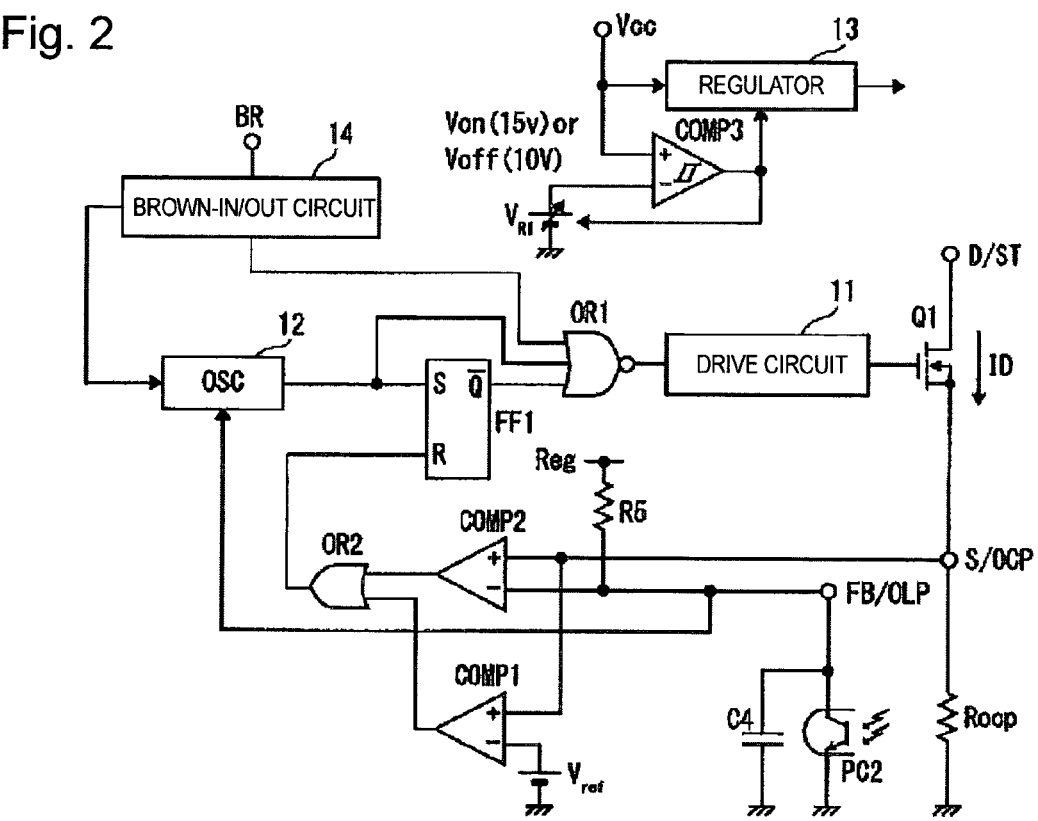
FIG. 2 is a diagram illustrating a circuit configuration according to a first embodiment of a controller IC illustrated in FIG. 1.

Next, a circuit configuration of controller IC 1 illustrated in FIG. 1 is described with reference to FIG. 2. Referring to FIG. 2, controller IC 1 includes switching element Q1 including a component such as an N-channel power MOSFET, drive circuit 11, OSC (internal oscillator) 12, regulator 13, brown-in/out circuit 14, reference voltage $V_{ref}$, variable voltage $V_{R1}$, OR-circuits OR1 and OR2, flip-flop FF1, comparators COMP1, COMP2, and COMP3, and resistor R5.

A drain terminal of switching element Q1 is connected to the D/ST terminal, and a source terminal of switching element Q1 is connected to the S/OCP terminal. Further, a gate terminal of switching element Q1 is connected to drive circuit 11 that controls ON/OFF by outputting drive signal DRV for driving switching element Q1. To drive circuit 11, an output of OR-circuit OR1 is inputted.

To an input terminal of OR-circuit OR1, an output of OSC 12, an output of inversion output terminal Q⁻ of flip-flop FF1, and an output of brown-in/out circuit 14 are inputted. To an S terminal and an R terminal of flip-flop FF1, the output of OSC 12 and an output of OR-circuit OR2 are connected, respectively. A pulse width of a clock signal outputted from OSC 12 is set to be less than a minimum ON duration of switching element Q1. Flip-flop FF1 serves as a PWM latch circuit. Assume that an output signal of OSC 12 is at L level (a state in which a clock signal is not outputted), and flip-flop FF1 is set so that an output signal of inversion output terminal Q⁻ is at L level (an output of brown-in/out circuit 14 is also at L level). In this case, an output signal at H level is inputted from OR-circuit OR1 to drive circuit 11, so that switching element Q1 is turned on.

The S/OCP terminal is connected to a non-inversion terminal of comparator COMP1 and a non-inversion terminal of comparator COMP2. Comparator COMP1 is an OCP comparator that detects an overcurrent. Reference voltage $V_{ref}$ serving as an overcurrent threshold is connected to an inversion terminal of comparator COMP1. When voltage signal $V_{OCP}$ of the S/OCP terminal corresponding to drain electric current ID flowing through switching element Q1 is equal to or greater than reference voltage $V_{ref}$ serving as the overcurrent threshold, comparator COMP1 outputs an output signal at H level. The output signal at H level of comparator COMP1 resets flip-flop FF1 via OR-circuit OR2, thereby allowing OR-circuit OR1 to output an output signal at L level, so that switching element Q1 is turned off.

Comparator COMP2 is a current sense converter for performing feedback control of a duty ratio of switching element Q1 based on the FB signal that is inputted to the FB/OLP terminal as voltage signal $V_{FB}$. An inversion terminal of comparator COMP2 is connected to reference voltage Reg via resistor R5. The inversion terminal of comparator COMP2 is also connected to the FB/OLP terminal. Comparator COMP2 compares voltage signal $V_{OCP}$ with voltage signal $V_{FB}$, and outputs an output signal at H level when voltage signal $V_{OCP}$ is equal to or greater than voltage signal $V_{FB}$. The output signal at H level of comparator COMP2 resets flip-flop FF1 via OR-circuit OR2, thereby allowing OR-circuit OR1 to output an output signal at L level, so that switching element Q1 is turned off. The feedback control of the duty ratio of switching element Q1 based on the FB signal is thus performed.

Comparator COMP3 compares power-supply voltage $V_{CC}$ for IC of the Vcc terminal with variable voltage $V_{R1}$. Of comparator COMP3, a non-inversion terminal and an inversion terminal are connected to the Vcc terminal and variable voltage $V_{Ed}$, respectively. An output signal from comparator COMP3 is inputted to variable voltage $V_{R1}$. When the output signal from comparator COMP 3 is at Low level, variable voltage $V_{R1}$ is set to first reference voltage $V_{on}$ (e.g., 15V). When the output signal from comparator COMP 3 is at H level, variable voltage $V_{R1}$ is set to second reference voltage $V_{off}$ (e.g., 10V) that is lower than first reference voltage $V_{on}$. Thus, the output signal of comparator COMP3 has a hysteresis property. Therefore, when smoothing capacitor C3 illustrated in FIG. 1 is charged by a startup circuit not illustrated so that power-supply voltage $V_{CC}$ for IC exceeds first reference voltage $V_{on}$, the output signal of comparator COMP3 is at H level. When power-supply voltage $V_{CC}$ for IC becomes equal to or below second reference voltage $V_{off}$, the output signal of comparator COMP3 is at L level.

Further, an output terminal of comparator COMP3 is connected to regulator 13. Regulator 13 receives power supplied from the Vcc terminal. When the output signal of comparator COMP3 is at H level, regulator 13 operates and supplies a power-supply voltage for operation of each component of controller IC 1. In other words, the output signal of comparator COMP3 controls ON/OFF of controller IC 1, and the output signal of comparator COMP3 is at H level during normal operation of controller IC 1 (during switching operation ON). Therefore, first reference voltage $V_{on}$ of variable voltage $V_{R1}$ is an operation starting voltage of controller IC 1, and second reference voltage $V_{off}$ of variable voltage $V_{R1}$ is an operation stopping voltage of controller IC 1.

Brown-in/out circuit 14 monitors the input voltage of the commercial alternating-current power supply AC based on the voltage of the BR terminal. When this input voltage is below a lower-limit threshold voltage value that is set beforehand, brown-in/out circuit 14 outputs an output signal at H level to OR-circuit OR1. This allows OR-circuit OR1 to output an output signal at L level, so that switching element Q1 is turned off. While the output signal of brown-in/out circuit 14 stays at H level, the switching operation is stopped to prevent an over-input current and overheat.

Brown-in/out circuit 14 determines whether the input voltage of the commercial alternating-current power supply AC is an AC 100-V system or an AC 200-V system based on the voltage of the BR terminal, and notifies OSC (internal oscillator) 12 of a determination result. In the first embodiment, for example, when the input voltage of the commercial alternating-current power supply AC is on the order of AC 85 V to AC 130 V, brown-in/out circuit 14 determines that this input voltage is the AC 100-V system. On the other hand, when the input voltage of the commercial alternating-current power supply AC is on the order of AC 180 V to AC 265 V, brown-in/out circuit 14 determines that this input voltage is the AC 200-V system.

OSC 12 receives voltage signal $V_{FB}$ of the FB/OLP terminal, as well as the determination result (the AC 100-V system or the AC 200-V system) of brown-in/out circuit 14. OSC 12 has a frequency decreasing function. The frequency decreasing function is provided to decrease an oscillation frequency (a switching frequency) of a clock signal to be outputted according to the voltage signal $V_{FB}$ of the FB/OLP terminal at low/middle load, thereby reducing a loss in switching element Q1, to improve efficiency. OSC 12 has a first frequency decrease setting for AC 100-V system and a second frequency decrease setting for AC 200-V system, as settings for performing the frequency decreasing function.

Figure 3:
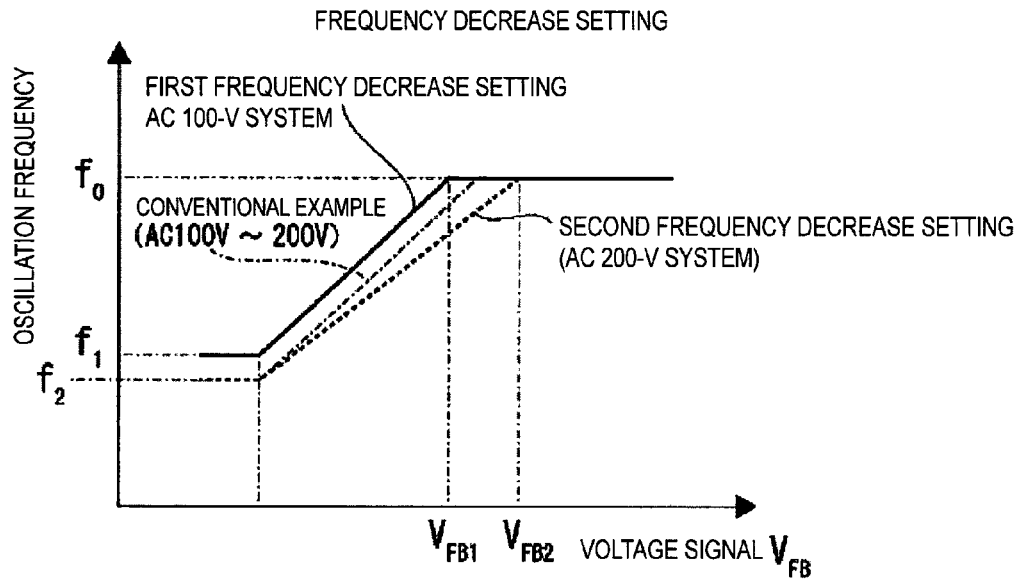
FIG. 3 is a graph illustrating a frequency decrease setting in an OSC illustrated in FIG. 2.

FIG. 3 illustrates the first frequency decrease setting for AC 100-V system indicated by a solid line, and the second frequency decrease setting for AC 200-V system indicated by a dotted line, in graph form. Of the graph illustrated in FIG. 3, a horizontal axis represents voltage signal $V_{FB}$ of the FB/OLP terminal, and a vertical axis represents the oscillation frequency of the clock signal outputted by OSC 12. Further, a graph indicated by dashed lines represents a conventional frequency decrease setting that does not vary according to an input voltage.

When the determination result of brown-in/out circuit 14 is the AC 100-V system, OSC 12 performs the frequency decreasing function based on the first frequency decrease setting. When the determination result of brown-in/out circuit 14 is the AC 200-V system, OSC 12 performs the frequency decreasing function based on the second frequency decrease setting. The oscillation frequency in OSC 12 may be controlled continuously based on the graph illustrated in FIG. 3, or controlled stepwise.

Figure 4A:
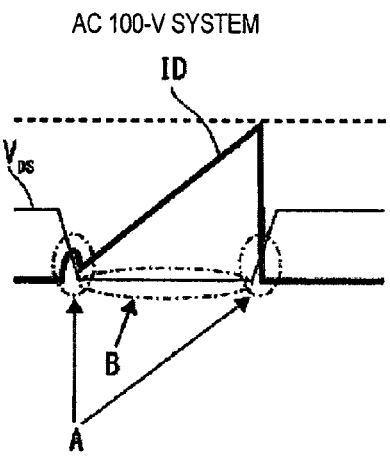
FIGS. 4A and 4B are waveform diagrams for describing a loss in a switching element illustrated in FIG. 2.
Figure 4B:
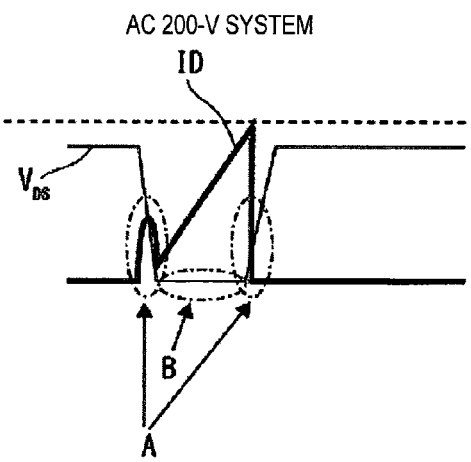

Here, there is made a comparison between a case where the input voltage is the AC 100-V system and a case where the input voltage is the AC 200-V system, in terms of the loss in switching element Q1. FIG. 4A illustrates drain-source voltage $V_{DS}$ and drain electric current ID in waveform when the input voltage is the AC 100-V system. FIG. 4B illustrates drain-source voltage $V_{DS}$ and drain electric current ID in waveform when the input voltage is the AC 200-V system. When these two cases are compared, $V_{DS}$ of the AC 200-V system is about twice as high as $V_{DS}$ of the AC 100-V system, and an ON period of the AC 200-V system is about half an ON period of the AC 100-V system. Therefore, a switch loss (a loss that occurs during a period when a voltage drops due to a flow of drain electric current ID) indicated by arrows A in each of FIGS. 4A and 4B is small in the AC 100-V system and large in the AC 200-V system. On the other hand, an ON-period loss (a conduction loss that occurs due to a voltage drop during the ON period) indicated by an arrow B is large in the AC 100-V system and small in the AC 200-V system.

Power Po to be transmitted to the secondary side is expressed by $Po=1/2 \times L \times ID^2 \times f$, where an inductance of primary winding P of transformer T is "L" and a switching frequency is "f". When the same power Po is transmitted to the secondary side, a decrease in switching frequency f naturally reduces the switch loss proportional to switching frequency f, but drain electric current ID increases, thereby extending the ON period. This tendency is strong in the AC 100-V system where $V_{DS}$ is low. Therefore, in the AC 100-V system where the ON-period loss is large and dominant as described above, efficiency is rather reduced when switching frequency f is decreased. In this way, at a middle load, loss occurring points vary between the AC 100-V system and the AC 200-V system.

Therefore, in the first embodiment, the first frequency decrease setting and the second frequency decrease setting are provided to control the oscillation frequency optimally in each of the case where the input voltage is the AC 100-V system and the case where the input voltage is the AC 200-V system. As illustrated in FIG. 3, in the first frequency decrease setting, decrease starting voltage $V_{FB1}$ serving as a frequency variable operation point for starting a decrease from fixed frequency $F_0$ is set to be lower than decrease starting voltage $V_{FB2}$ serving as a frequency variable operation point for starting a decrease from fixed frequency $F_0$ in the second frequency decrease setting. Therefore, in the case where the input voltage is the AC 200-V system, when a load becomes lower, OSC 12 starts decreasing the oscillation frequency earlier than in the case where the input voltage is the AC 100-V system. In the AC 200-V system where the switch loss is dominant, efficiency can be effectively improved by starting a decrease of the oscillation frequency in early timing. On the other hand, in the AC 100-V system where the ON-period loss is dominant, efficiency can be effectively improved by delaying start of a decrease in the oscillation frequency to prevent an increase in the ON-period loss.

Further, as illustrated in FIG. 3, lowest frequency $f_1$ in the first frequency decrease setting is set to be higher than lowest frequency $f_2$ in the second frequency decrease setting. Therefore, at a light load, OSC 12 performs control so that the oscillation frequency in the case where the input voltage is of the AC 100-V system is higher than the oscillation frequency in the case where the input voltage is of the AC 200-V system. Within an entire range in which the oscillation frequency is decreased, OSC 12 performs control for the voltage signals $V_{FB}$ at the same level such that the oscillation frequency for the input voltage of the AC 100-V system is higher than the oscillation frequency for the input voltage of the AC 200-V system. Therefore, at a light load, in the AC 200-V system where the switch loss is dominant, the oscillation frequency is decreased to 25 kHz by reducing the number of switching times, so that the switch loss is reduced, and thus efficiency can be effectively improved. On the other hand, in the AC 100-V system where the ON-period loss is dominant, at a light load, the oscillation frequency is increased to 30 kHz to shorten the ON period, so that the ON-period loss is reduced and thus, efficiency can be effectively improved.

Figure 5A:
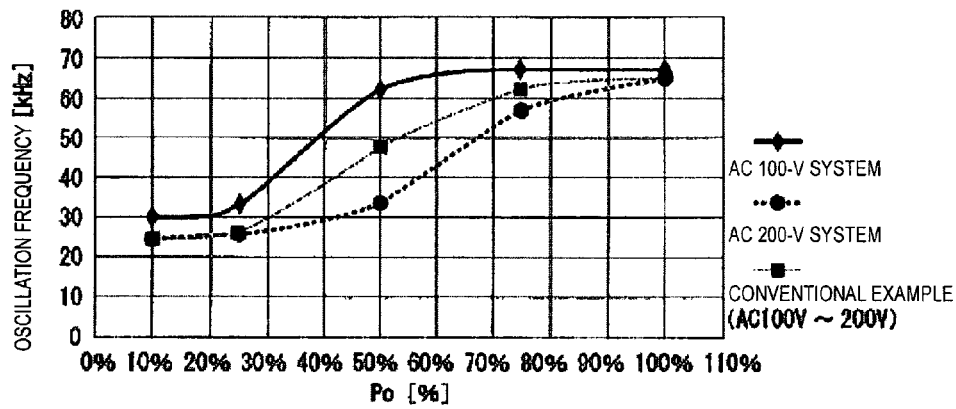
FIGS. 5A to 5C are graphs for describing effects of efficiency improvements associated with frequency characteristics according to an embodiment of a switching power-supply device.

FIG. 5A illustrates a relationship between load factor Po (%) and oscillation frequency (kHz) in a case where the frequency decreasing function is performed in the first embodiment. A solid line indicates a case of performing the frequency decreasing function in the first frequency decrease setting for AC 100-V system. A dotted line indicates a case of performing the frequency decreasing function in the second frequency decrease setting for AC 200-V system. A dashed line indicates a case of performing a frequency decreasing function in a conventional frequency decrease setting. From FIG. 5A, the following is found. When the load factor falls, the oscillation frequency starts decreasing earlier in the case where the input voltage is of the AC 200-V system than in the case where the input voltage is of the AC 100-V system. In the conventional frequency decrease setting, the oscillation frequency starts decreasing at a load factor of 75%. In contrast, the oscillation frequency starts decreasing at a load factor of 100% in the AC 200-V system and at a load factor of 50% in the AC 100-V system. Further, it is found that, at a middle load to a light load, the oscillation frequency for the input voltage of the AC 100-V system is controlled to be higher than the oscillation frequency for the input voltage of the AC 200-V system. Furthermore, it is found that, lowest frequency $f_1$ for the input voltage of the AC 100-V system is controlled to be higher than lowest frequency $f_2$ for the input voltage of the AC 200-V system. The oscillation frequency for the input voltage of the AC 100-V system is controlled to be lowest frequency $f_1 \approx 30$ kHz at a load factor in a range from 10% to 25%. The oscillation frequency for the input voltage of the AC 200-V system is controlled to be lowest frequency $f_2 \approx 25$ kHz at a load factor in a range from 10% to 25%.

Figure 5B:
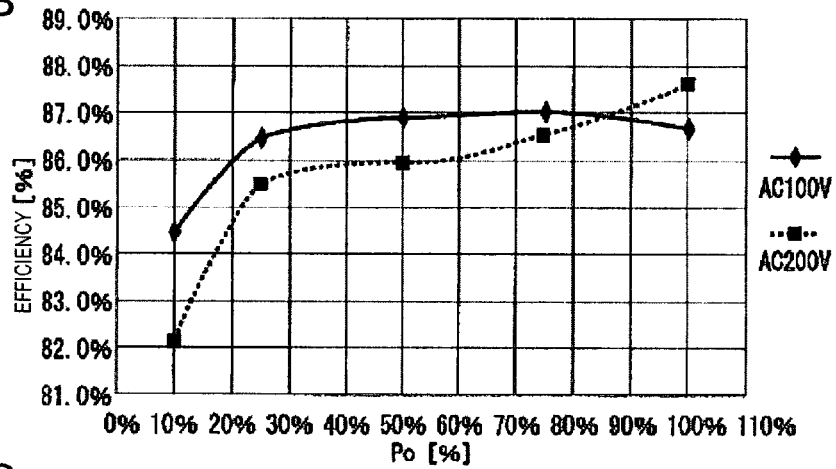
Figure 5C:
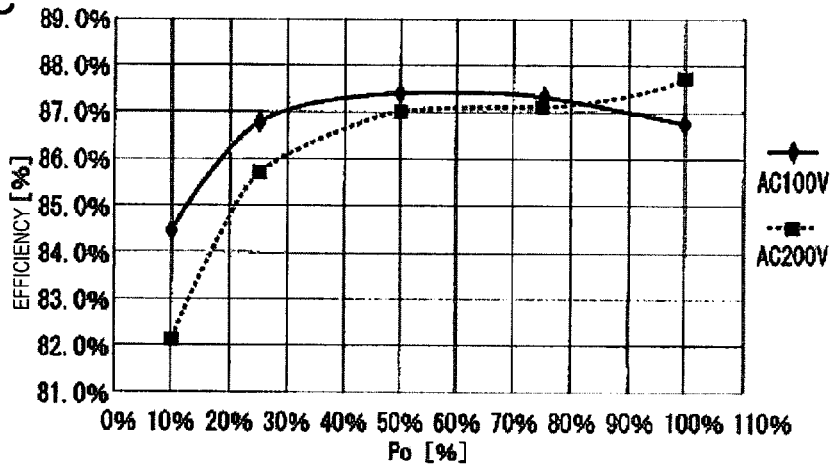

FIG. 5B illustrates a relationship between load factor Po (%) and efficiency (%) in the case of performing the frequency decreasing function in the conventional frequency decrease setting indicated by the dashed line in FIG. 5A. In FIG. 5B, a solid line is a graph representing a case where an input voltage is of the AC 100-V system, and a dotted line is a graph representing a case where an input voltage is of the AC 200-V system. Further, FIG. 5C illustrates a relationship between load factor Po (%) and efficiency (%) in a case where; the first frequency decrease setting for AC 100-V system indicated by the solid line in FIG. 5A is performed when the input voltage is of the AC 100-V system; and the second frequency decrease setting for the AC 200-V system indicated by the dotted line in FIG. 5A is performed when the input voltage is of the AC 200-V system. In FIG. 5C, a solid line is a graph representing the case where the input voltage is of the AC 100-V system, and a dotted line is a graph representing the case where the input voltage is of the AC 200-V system.

Referring to FIGS. 5B and 5C, the following is found. As compared with the case of performing the frequency decreasing function in the conventional frequency decrease setting, efficiency is improved in the case of performing the frequency decrease settings of the first embodiment. In other words, efficiency is more improved in the case of performing the frequency decreasing function in the first frequency decrease setting and the second frequency decrease setting of the first embodiment, regardless of whether the input voltage is of the AC 100-V system or the AC 200-V system. In particular, efficiency is improved at a load factor in a range from 20% to 80%.

In the first embodiment, the frequency variable operation point varies depending on the input voltage. However, the frequency variable operation point may vary according to a power supply specification. For example, in a case of a 30-W specification, the frequency variable operation point may be set to load factor Po=40% to 60% in the AC 100-V system, while being set to load factor Po=80% to 100% in the AC 200-V system. In a case of a 100-W specification, the frequency variable operation point may be set to load factor Po=30% to 50% in the AC 100-V system, while being set to load factor Po=70% to 90% in the AC 200-V system.

Further, in the first embodiment, the input voltages are divided into the AC 100-V system and the AC 200-V system, and the frequency decreasing function is performed based on the first frequency decrease setting and the second frequency decrease setting corresponding to the respective systems. However, the input voltages may be divided into three or more systems, and frequency decrease settings corresponding to the respective systems may be provided and performed.

Furthermore, in the first embodiment, it is determined whether the input voltage of the commercial alternating-current power supply AC is the AC 100-V system or the AC 200-V system, by detecting the direct-current voltage rectified by rectifier circuit DB. However, whether the input voltage is of the AC 100-V system or the AC 200-V system may be determined by directly detecting the input voltage of the commercial alternating-current power supply AC, or by detecting a voltage of a startup terminal or a voltage of a forward-voltage detection terminal.

As described above, the following switching power-supply device is provided according to the first embodiment. The switching power-supply device applies a direct-current voltage, to which an input voltage of alternating-current power supply AC is rectified, to primary winding P of transformer T to cause switching operation of switching element Q1 connected to primary winding P of transformer T, thereby inducing a pulse voltage in secondary winding S of transformer T, and outputs, to a load, an output voltage rectified and smoothened by a secondary-side rectification smoothing circuit including rectifier diode D1 and smoothing capacitor C2. The switching power-supply device includes: brown-in/out circuit 14 serving as an input-voltage detection circuit configured to detect the input voltage of alternating-current power supply AC; error amplifier 2 configured to compare the output voltage with a reference voltage, to transmit a resultant error voltage to the primary side as a feedback signal ($V_{FB}$); and an internal oscillation circuit (OSC 12) configured to select any of frequency decrease settings according to the input voltage detected by brown-in/out circuit 14, and to perform, by using the selected frequency decrease setting, a frequency decreasing function of decreasing a switching frequency of switching element Q1 at a light load, according to the feedback signal ($V_{FB}$) transmitted from the secondary side to inform a state of the load.

In this configuration, the frequency decrease settings are prepared, and the frequency decreasing function can be performed by selecting any of the frequency decrease settings according to the input voltage. Therefore, operation at an optimum switching frequency according to the input voltage can be realized. Accordingly, efficiency can be improved as desired even if the input voltages vary.

Further, according to the first embodiment, brown-in/out circuit 14 determines whether the input voltage is of a first system (the AC 100-V system) or a second system (the AC 200-V system) whose voltage is higher than a voltage of the first system (the AC 100-V system). OSC 12 performs the frequency decreasing function by using the first frequency decrease setting when brown-in/out circuit 14 determines that the input voltage is of the AC 100-V system, and performs the frequency decreasing function by using the second frequency decrease setting when brown-in/out circuit 14 determines that the input voltage is of the AC 200-V system.

In this configuration, operation at an optimum switching frequency according to the input voltage can be realized by selectively using the first frequency decrease setting and the second frequency decrease setting different from each other, depending on the input voltage. Specifically, the first frequency decrease setting is used for the AC 100-V system where the input voltage is low, and the second frequency decrease setting is used for the AC 200-V system where the input voltage is higher than the input voltage in the AC 100-V system. Accordingly, efficiency can be improved as desired even if the input voltages vary.

Furthermore, according to the first embodiment, in the second frequency decrease setting, OSC 12 starts decreasing the switching frequency when a load is at a level heavier than in the first frequency decrease setting.

In this configuration, in the AC 200-V system where the switch loss is dominant, efficiency can be effectively improved by starting a decrease of the oscillation frequency in early timing. In addition, in the AC 100-V system where the ON-period loss is dominant, efficiency can be effectively improved by delaying start of a decrease in the oscillation frequency so that an increase in the ON-period loss is prevented.

Still further, according to the first embodiment, a lowest frequency of the switching frequency in the first frequency decrease setting is set to be higher than a lowest frequency of the switching frequency in the second frequency decrease setting.

In this configuration, at a light load, in the AC 200-V system where the switch loss is dominant, the oscillation frequency is decreased by reducing the number of switching times, so that the switch loss is reduced and thus, efficiency can be effectively improved. On the other hand, in the AC 100-V system where the ON-period loss is dominant, at a light load, the oscillation frequency is increased to shorten the ON period, so that an increase in the ON-period loss is prevented and thus, efficiency can be effectively improved.

Still furthermore, according to the first embodiment, for the feedback signals ($V_{FB}$) at the same level within the range where OSC 12 decreases the switching frequency, the switching frequency in the first frequency decrease setting is set to be higher than the switching frequency in the second frequency decrease setting.

In this configuration, in the AC 200-V system where the switch loss is dominant, the oscillation frequency is decreased by reducing the number of switching times, so that the switch loss is reduced and thus efficiency can be effectively improved. On the other hand, in the AC 100-V system where the ON-period loss is dominant, the oscillation frequency is increased to shorten the ON period, so that an increase in the ON-period loss is prevented and thus, efficiency can be effectively improved.

Figure 6:
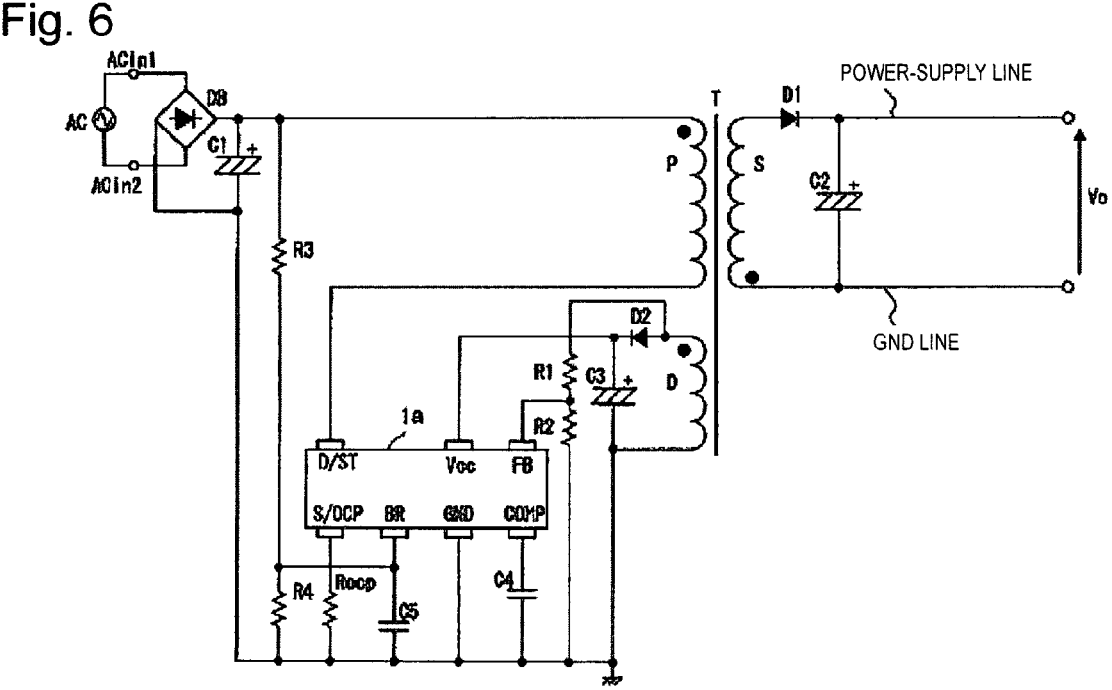
FIG. 6 illustrates a switching power-supply device according to a second embodiment.

FIG. 6 illustrates a switching power-supply device according to a second embodiment. A point different from the first embodiment is that photocoupler PC1 and error amplifier E/A 2 are removed, and controller IC 1 is replaced with controller IC 1a. Further, resistors R1 and R2 provided on the secondary side in the first embodiment are provided on the primary side in the second embodiment. In other words, in the first embodiment, error amplifier (E/A) 2 detects the difference between output voltage $V_O$ and the normal voltage, and transmits the feedback signal to controller IC 1 on the primary side via photocoupler PC1. In the second embodiment, voltage control is performed by detecting a tertiary winding voltage of transformer T thereby analogously detecting output voltage $V_O$.

Figure 7:
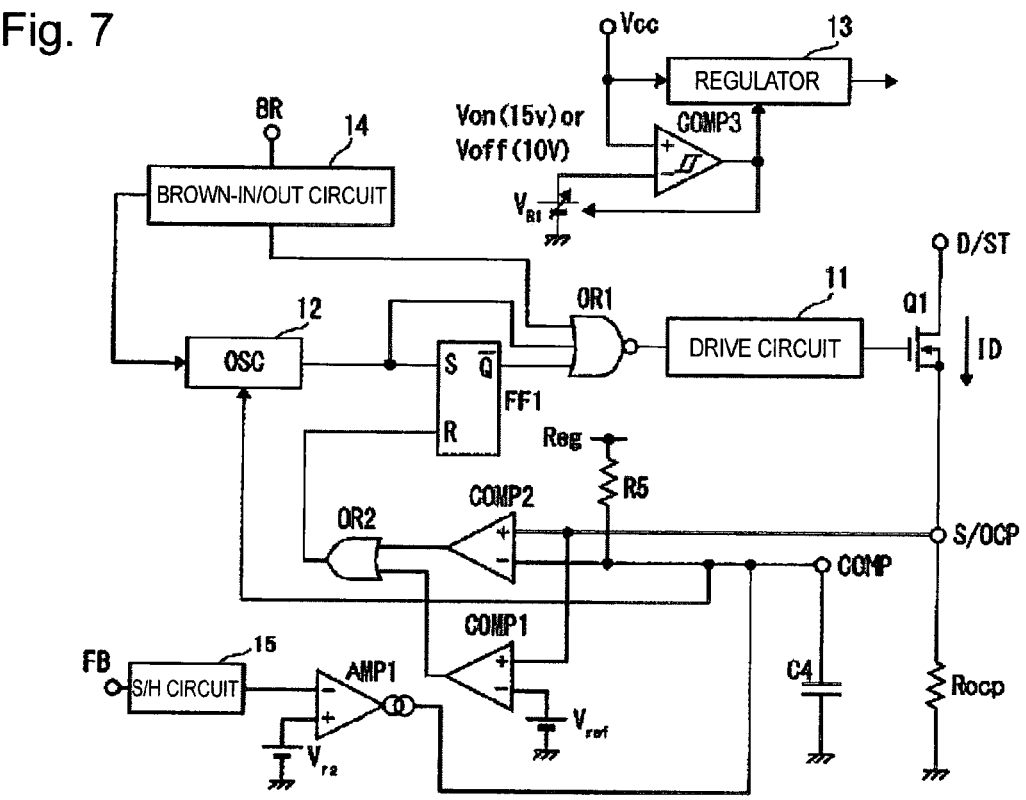
FIG. 7 is a circuit block diagram illustrating a circuit configuration of controller IC 1a illustrated in FIG. 6 according to the second embodiment.

FIG. 7 is a circuit block diagram illustrating a circuit configuration of controller IC 1a illustrated in FIG. 6 according to the second embodiment. In contrast to controller IC 1, controller IC 1a additionally includes sample-and-hold circuit (S/H circuit) 15, error amplifier AMP1, and reference voltage $V_{r2}$. Further, the FB/OLP terminal is replaced with a COMP terminal, and S/H circuit 15 is assigned to an FB terminal.

Referring to FIGS. 6 and 7, in the switching power-supply device of the second embodiment, a series circuit including resistor R1 and resistor R2 divides the tertiary winding voltage of transformer T, and inputs a result to the FB terminal of controller IC 1a. S/H circuit 15 is connected to the FB terminal of controller IC 1a. S/H circuit 15 samples and holds a voltage in a period when switching element Q1 is off after turn-off. Error amplifier AMP1 compares the sampled and held voltage with reference voltage $V_{r2}$, and outputs an error signal obtained thereby to the COMP terminal as a feedback signal. Capacitor C4 is connected to an external COMP terminal, and performs phase compensation of error amplifier AMP1. Error amplifier AMP1 includes a component such as a current conductance amplifier.

Voltage control operation of output voltage $V_O$ is similar to that in the first embodiment and therefore will not be described. Although the second embodiment is different from the first embodiment in terms of the method of detecting output voltage $V_O$, effects similar to those of the first embodiment can be obtained.

According to the above-described embodiments, there is obtained such an effect that operation at an optimum switching frequency according to the input voltage can be realized and thus efficiency can be improved as desired even if the input voltages vary.

Although the invention is described using specific embodiments, the above-described embodiments are only examples, and may be modified and implemented without departing from the gist of the invention.

The invention claimed is:

1. A switching power-supply device that rectifies an input voltage of an alternating-current power supply to a direct-current voltage, applies the direct-current voltage to a primary winding of a transformer to cause switching operation of a switching element connected to the primary winding of the transformer, thereby inducing a pulse voltage in a secondary winding of the transformer, and outputs, to a load, an output voltage rectified and smoothened by a secondary-side rectification smoothing circuit including a rectifier diode and a smoothing capacitor, the switching power-supply device comprising:
an input-voltage detection circuit that detects the input voltage of the alternating-current power supply;
an error amplifier that compares the output voltage with a reference voltage, and transmits a resultant error voltage to a primary side as a feedback signal; and
an internal oscillation circuit that selects any of frequency decrease settings according to the input voltage detected by the input-voltage detection circuit, and performs, by using the selected frequency decrease setting, a frequency decreasing function of decreasing a switching frequency of the switching element at a light load, in response to the feedback signal transmitted from a secondary side to inform a state of the load, wherein
the input-voltage detection circuit determines whether the input voltage is of a first system or a second system whose voltage is higher than a voltage of the first system, and
the internal oscillation circuit performs the frequency decreasing function by using a first frequency decrease setting when the input-voltage detection circuit determines that the input voltage is of the first system, and performs the frequency decreasing function by using a second frequency decrease setting when the input-voltage detection circuit determines that the input voltage is of the second system.

2. The switching power-supply device according to claim 1, wherein, in the second frequency decrease setting, the internal oscillation circuit starts decreasing the switching frequency when a load is at a level heavier than in the first frequency decrease setting.

3. The switching power-supply device according to claim 1, wherein a lowest frequency of the switching frequency in the first frequency decrease setting is set to be higher than a lowest frequency of the switching frequency in the second frequency decrease setting.

4. The switching power-supply device according to claim 1, wherein, for the feedback signal at a same level in a range where the internal oscillation circuit decreases the switching frequency, the switching frequency in the first frequency decrease setting is set to be higher than the switching frequency in the second frequency decrease setting.

5. A switching power-supply device that rectifies an input voltage of an alternating-current power supply to a direct-current voltage, applies the direct-current voltage to a primary winding of a transformer to cause switching operation of a switching element connected to the primary winding of the transformer, thereby inducing a pulse voltage in a secondary winding of the transformer, and outputs, to a load, an output voltage rectified and smoothened by a secondary-side rectification smoothing circuit including a rectifier diode and a smoothing capacitor, the switching power-supply device comprising:
an input-voltage detection circuit that detects the input voltage of the alternating-current power supply;
an error amplifier that samples and holds a voltage generated in a tertiary winding of the transformer after the switching element is turned off, obtains an error voltage by comparing the sampled and held voltage with a reference voltage, and outputs the error voltage as a feedback signal to a control circuit that controls the switching operation of the switching element; and
an internal oscillation circuit that selects any of frequency decrease settings according to the input voltage detected by the input-voltage detection circuit, and performs, by using the selected frequency decrease setting, a frequency decreasing function of decreasing a switching frequency of the switching element at a light load, in response to the feedback signal transmitted from a secondary side to inform a state of the load, wherein the input-voltage detection circuit determines whether the input voltage is of a first system or a second system whose voltage is higher than a voltage of the first system, and the internal oscillation circuit performs the frequency decreasing function by using a first frequency decrease setting when the input-voltage detection circuit determines that the input voltage is of the first system, and performs the frequency decreasing function by using a second frequency decrease setting when the input-voltage detection circuit determines that the input voltage is of the second system.

6. The switching power-supply device according to claim 5, wherein, in the second frequency decrease setting, the internal oscillation circuit starts decreasing the switching frequency when a load is at a level heavier than in the first frequency decrease setting.

7. The switching power-supply device according to claim 5, wherein a lowest frequency of the switching frequency in the first frequency decrease setting is set to be higher than a lowest frequency of the switching frequency in the second frequency decrease setting.

8. The switching power-supply device according to claim 5, wherein, for the feedback signal at a same level in a range where the internal oscillation circuit decreases the switching frequency, the switching frequency in the first frequency decrease setting is set to be higher than the switching frequency in the second frequency decrease setting.

9. A switching power-supply device comprising:
a transformer comprising a rectifier circuit that rectifies an input voltage of an alternating-current power supply, a primary winding to which a direct-current voltage rectified by the rectifier circuit is to be applied, a switching element connected to the primary winding, a secondary winding that induces a pulse voltage based on switching of the switching element, a rectifier diode, and a smoothing capacitor, wherein the transformer outputs an output voltage rectified and smoothened;

an input-voltage detection circuit that detects the input voltage;

an error amplifier that compares the output voltage with a reference voltage, and outputs a resultant error voltage as a feedback signal; and an internal oscillation circuit that decreases a switching frequency of the switching element at a light load, based on the input voltage detected by the input-voltage detection circuit, and the feedback signal wherein the input-voltage detection circuit determines whether the input voltage is of a first system or a second system whose voltage is higher than a voltage of the first system, and the internal oscillation circuit decreases the switching frequency using a first frequency decrease setting when the input-voltage detection circuit determines that the input voltage is of the first system, and decreases the switching frequency using a second frequency decrease setting when the input-voltage detection circuit determines that the input voltage is of the second system.

* * * * *